C. H. FOSS.
CORN-PLANTER.
No. 186,928. Patented Feb. 6, 1877.
Fig. 1.
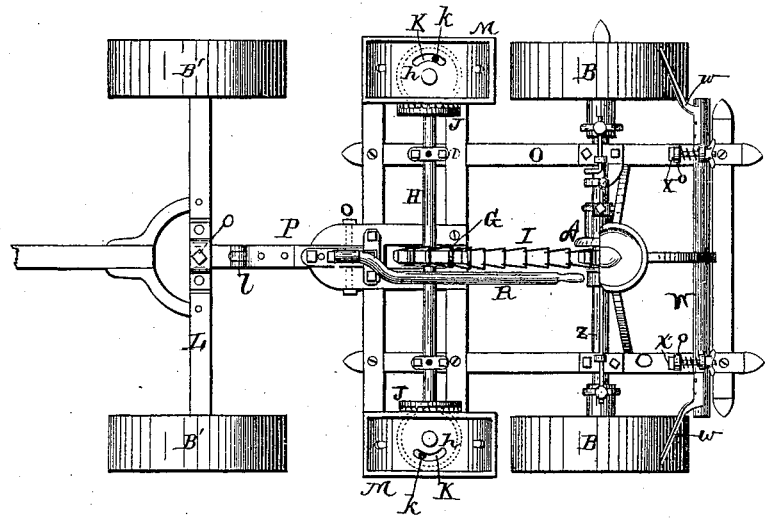
Fig. 2.
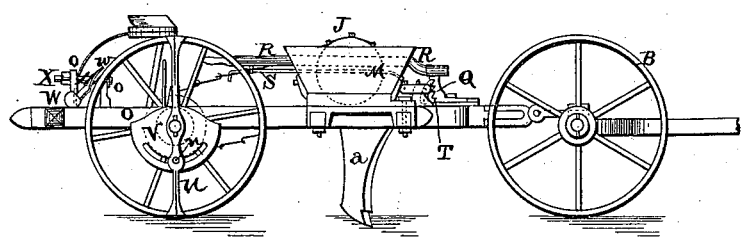
Fig. 3.
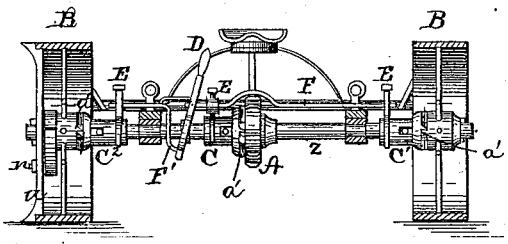
Fig. 4.
WITNESSES:
J. Wm Garner
F. M. Burnham.
INVENTOR:
Chas. H. Foss
per
F. W. Lehmann,
Atty.

UNITED STATES PATENT OFFICE.

CHARLES H. FOSS, OF WATSEKA, ILLINOIS.

IMPROVEMENT IN CORN-PLANTERS.

Specification forming part of Letters Patent No. 186,928, dated February 6, 1877; application filed August 31, 1876.

*To all whom it may concern:*

Be it known that I, CHARLES H. FOSS, of Watseka, county of Iroquois, in the State of Illinois, have invented certain new and useful Improvements in Automatic Self-Dropping Corn-Planters; and the following is a clear, full, and concise statement and description of the construction and operation of the same, so that others skilled in the art may know how to make and use the same, reference being made to the accompanying drawings, with letters and figures marked thereon, which is made a part of this specification.

Figure 1 is a representation of my automatic self-dropping corn-planter, plan view, which has not less than four wheels. Fig. 2 is a side elevation. Fig. 3 is a transverse section; Fig. 4, a detail view.

O represents a suitable frame, which is attached to the axle Z, and supported upon the two wheels B. Loosely connected to the front of this frame by the bar P is the front axle L, which is supported by the wheels B'. Upon the rear end of this bar P is secured a casting, Q, which has a socket in it to receive the hand-lever R, and a ratchet, T, formed on its rear edge, in which a pawl catches. By raising up on the lever R, which extends back within easy reach of the driver's seat, the front end of the frame O is raised upward and held by the ratchet and pawl, so that the drills will be raised above the ground. Upon the axle Z is placed a loose pulley, A, over which the endless chain I passes, and upon the front end of the frame O is placed the shaft H, upon which is placed a fixed spur-wheel, G, around which the chain also passes so as to turn the shaft and revolve the seed-plates K, through the wheels J on its ends. Over the tops of the feed-wheels K, which have cogs all around their edges, to engage with the wheels J, and two or more tapering holes, $k$, through them, for the grain to fall through, are the plates $h$, which have a slot through them to let the grain through to the plates K. These plates are held down in position by suitable latches inside of the seed-boxes M, and have a raised socket formed on them, which fits down over a projection on the revolving grain-plates K, and serves both to hold the plates K in position and as a handle to raise the plate $h$ out of the box.

On one side of the loose wheel A is formed a clutch or teeth, $a'$, with which the sliding clutch C, which is feathered upon the axle, engages, for the purpose of turning the wheel A, and through it operating the seed-plates. The clutch C is connected to the rod F by means of the bifurcated rod and set-screw E. The rod F extends across the frame, just above the axle, and has a hand-lever, D, for operating it, fastened to one end, and another clutch, $C^1$, fastened to its other end, for the purpose of making the wheel B turn the shaft with it, instead of turning loosely around, as it otherwise would. Attached to the lower end of the lever D is a shorter rod, F', which has another clutch, $C^2$, fastened to it for engaging with the other wheel B, each of the wheels having a corresponding clutch, $a'$, formed on their inner sides. Secured to the outside of the wheel B is the flat plate V, in which is made a circular slot, and through this slot passes a clamping-bolt, $n$, which secures the indicator $u$ in any desired position on the wheel. This indicator is pivoted on the end of the axle, has shoulders on its outer ends, so as to catch just inside the rim of the wheel, and enlarged ends, which make a mark upon the ground as the wheel revolves, carrying the indicator with it, so as to show where the corn is dropped in the row. Connected to the pawl is a lever, S, which runs along the side of the hand-lever R, and by means of which the pawl is moved back and forth.

Having thus described my invention, I claim—

1. The combination of the hand-lever D, rod and set-screws E, rods F F', and clutches C $C^1$ $C^2$ and $a'$ $a'$, whereby the two wheels and the driving-pulley are thrown in gear with the axle at the same movement, substantially as shown.

2. A plate, V, having a circular slot rigidly secured to the wheel, in combination with the indicator $u$, adapted to be adjusted back and forth on the plate, and clamped in position by the bolt $n$, which passes through the slot, substantially as described.

3. The combination of the front axle L and wheels B', the connecting-bar P, jointed at each end $o$ and $l$, the hand-lever R, casting Q, having the ratchet T and lever S, for operating the pawl, whereby the front end of the frame can be raised, substantially as specified.

In witness that I claim the above I hereunto set my hand in the presence of two witnesses.

CHARLES H. FOSS.

Witnesses:
L. H. MORRIS,
L. O. WILSON.